United States Patent
Connelly et al.

(10) Patent No.: US 7,342,612 B1
(45) Date of Patent: Mar. 11, 2008

(54) SYSTEM AND METHOD FOR CONTROLLING AN ELECTRONIC DEVICE

(75) Inventors: Jay H. Connelly, Portland, OR (US); Herman D'Hooge, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/250,940

(22) Filed: Feb. 18, 1999

(51) Int. Cl.
*H04N 7/00* (2006.01)

(52) U.S. Cl. .................. 348/460; 348/465; 348/734; 386/83

(58) Field of Classification Search .......... 348/460, 348/6, 10, 465, 477, 734, 725, 553, 569, 348/12, 13; 386/83; 725/133, 141, 153, 725/80
See application file for complete search history.

(56) References Cited

U.S. PATENT DOCUMENTS

| | | | | |
|---|---|---|---|---|
| 5,963,264 A | * | 10/1999 | Jackson | 348/460 |
| 5,988,078 A | * | 11/1999 | Levine | 348/460 |
| 6,052,145 A | * | 4/2000 | Macrae et al. | 348/460 |
| 6,057,874 A | * | 5/2000 | Michaud | 348/460 |
| 6,108,042 A | * | 8/2000 | Adams et al. | 348/460 |
| 6,115,057 A | * | 9/2000 | Kwoh et al. | 348/460 |
| 6,252,630 B1 | * | 6/2001 | Kusumi et al. | 348/460 |
| 6,353,635 B1 | * | 3/2002 | Montague et al. | 348/460 |
| 6,408,435 B1 | * | 6/2002 | Sato | 348/460 |

OTHER PUBLICATIONS

"What's Purple and Knows 14,000 words?". Business Week, Feb. 17, 1997, p. 42.
"Tuned for VCR and PC", M. Costello, Consumer Electronics Online News, Feb. 15, 1997.

* cited by examiner

*Primary Examiner*—Trang U. Tran
(74) *Attorney, Agent, or Firm*—Kenyon & Kenyon LLP

(57) ABSTRACT

A communication and control system includes a command device for generating a command signal and an input device for generating a data signal. A first device of the system receives the command and data signals to generate a transmission signal. A second device of the system receives the transmission signal and extracts the command signal and the data signal from the transmission signal. The system also includes a target device, which is controlled as a function of the command signal, and an output device, which receives the data signal.

9 Claims, 5 Drawing Sheets

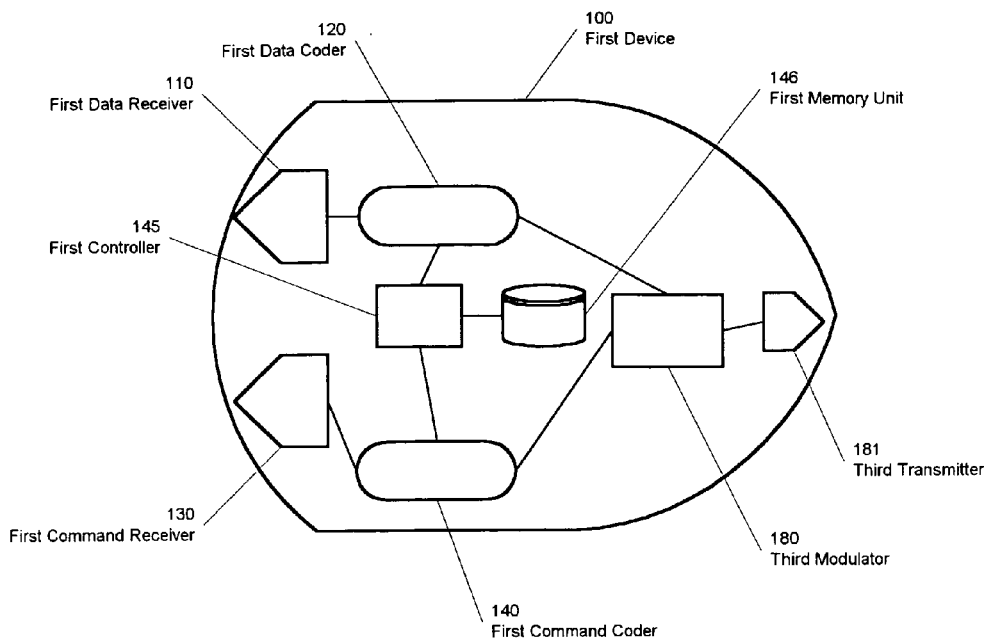
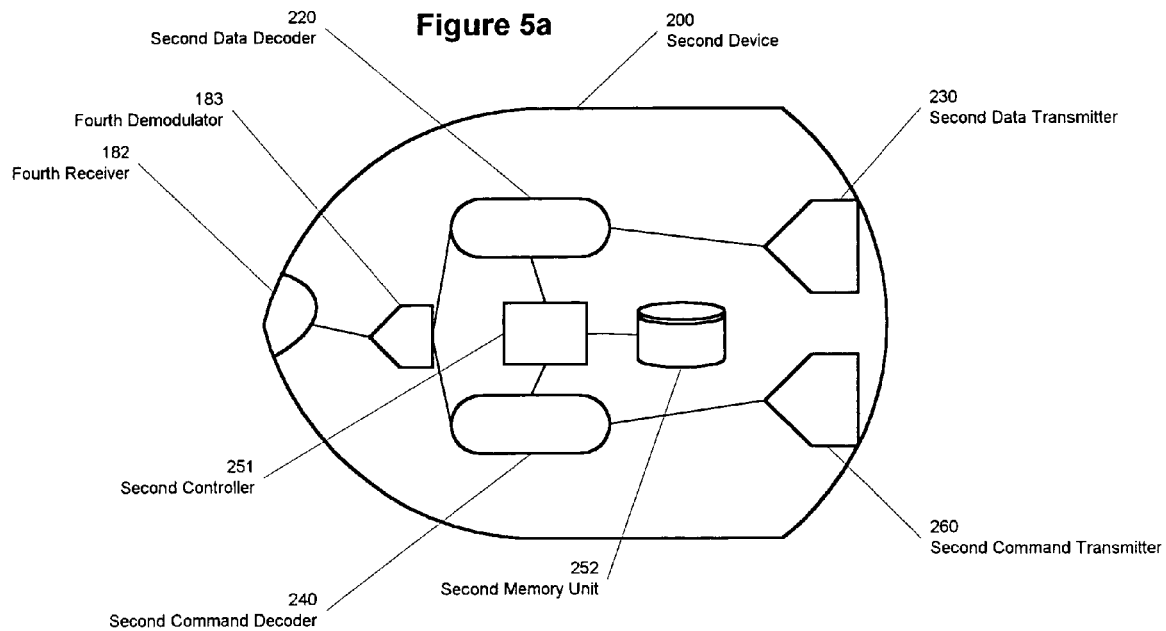

SYSTEM AND METHOD FOR CONTROLLING AN ELECTRONIC DEVICE

FIELD OF INVENTION

The present invention relates to a system and method for controlling an electronic device. More particularly, the present invention relates to a system which allows control of the electronic device using command signals which are broadcast with data signals.

BACKGROUND OF THE INVENTION

A television ("TV") program, e.g., a TV movie, is transmitted to TV viewers using a conventional transmission system, such as a television broadcast system, a cable system, etc. The conventional transmission system includes a network transmission center and a conventional television set. The conventional television set receives a TV signal from the network transmission center. The TV signal may include video signals, audio signals and close captioning signals. A combination of the video and audio signals correlates video and sound in the TV program.

However, capabilities of this conventional transmission system are limited. For example, the television set can receive the TV signal which typically includes only video and sound signals. Thus, a TV producer has limited options producing the TV program. The TV producer cannot generate other signals to produce, e.g., special effects during broadcasting of the TV program because such other signals cannot be transmitted and executed simultaneously with the video and audio signals. For instance, it would be desirable to generate, e.g., signals that would control lights in a TV viewer's room. Furthermore, the TV program is periodically interrupted for an advertisement; the advertisement cannot be shown simultaneously with the TV program.

To make the TV program more compelling and without interruptions, it would be beneficial to transmit other signals together with the TV signal. Other signals may include signals for controlling other electronic devices or providing other forms of advertisement.

SUMMARY OF THE INVENTION

The present invention relates to a communication and control system which includes a command device generating a command signal and an input device generating a data signal. A first device of the system receives the command and data signals to generate a transmission signal. A second device of the system receives the transmission signal and extracts the command signal and the data signal from the transmission signal. The system also includes a target device, which is controlled as a function of the command signal, and an output device, which receives the data signal.

BRIEF DESCRIPTION OF THE DRAWINGS

FIG. 4a shows yet another embodiment of the first device according to the present invention.

FIG. 5a shows yet another embodiment of the second device according to the present invention.

DETAILED DESCRIPTION

Figure 1:
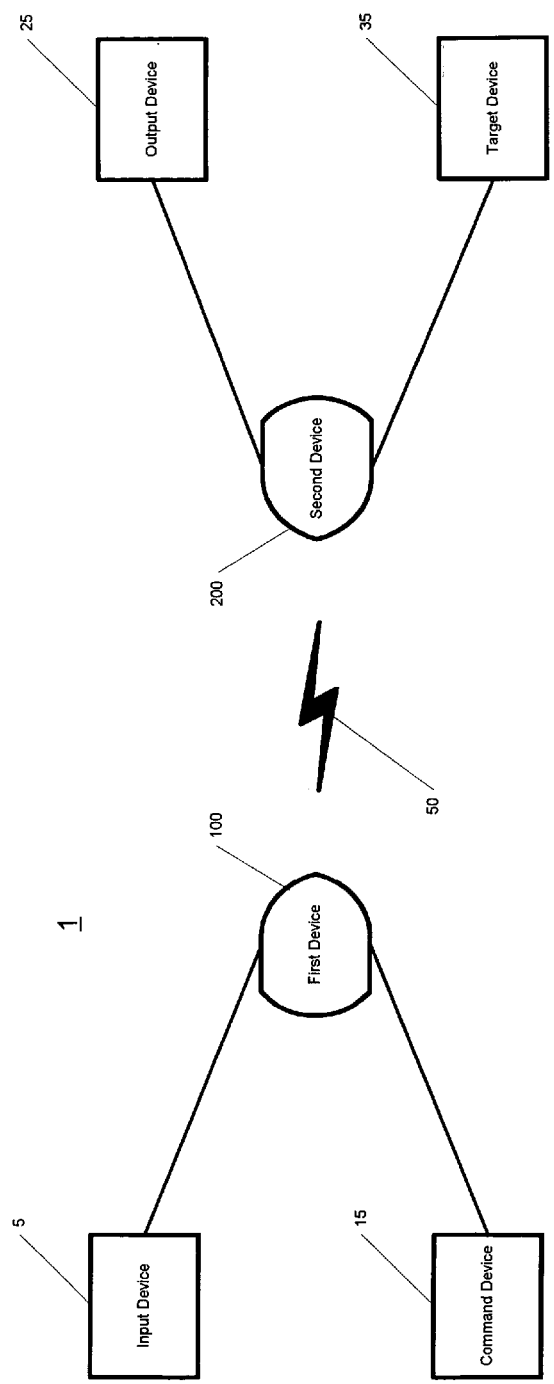
FIG. 1 shows an embodiment of a system according to the present invention.

FIG. 1 shows a system 1 according an embodiment of the present invention. System 1 includes a first device 100 (e.g., a Network Operations Center) and a second device 200. First device 100 may received a command signal from at least one command device 15. In addition, first device 100 may receive a data signal from at least one input device 5. The data signal may include, e.g., video signals, audio signals and/or other information signals. In this embodiment, the command signal includes instructions for executing a predetermined procedure.

First device 100 transmits the data and command signals to second device 200 over a network 50. Network 50 may include, e.g., a television broadcast network, a satellite system, a communication network (such as the Internet), a cable system, a telephone system, etc. Second device 200 processes these signals and forwards the data signal to at least one output device 25. The command signal may be transmitted by second device 200 and executed by a target device 35. Alternatively, the command signal may be executed by second device 200 to generate a control signal which controls target device 35.

Output device 25 may include, e.g., a display device such as a television set, a projector, a display unit, a LCD (Liquid Crystal Device), a sound producing device, a data processing device, etc. Target device 35 may include, e.g., a climate control device, a light controller, a sound system (e.g., a parametric equalizer), a computer, a printer, a telephone, a VCR (Video Cassette Recorder), a home appliance control device, a television set, a toy, a motorized device, a controllable device, etc. In an embodiment of the present invention, second device 200 may include output device 25 and target device 35.

According to an embodiment of the present invention, the command signal may control an electronic device such as second device 200, output 25 and/or target device 35. For example, the command signal can be used to control a home appliance while the data signal is being output. The data signal may display the TV program on the television set while the command signal may control an intensity of the lights in the room in which the TV program is being viewed. Thus, the lights may be dimmed or brightened at selected times during the TV program (thus, adding to a desired effect of the TV program).

Figure 2:
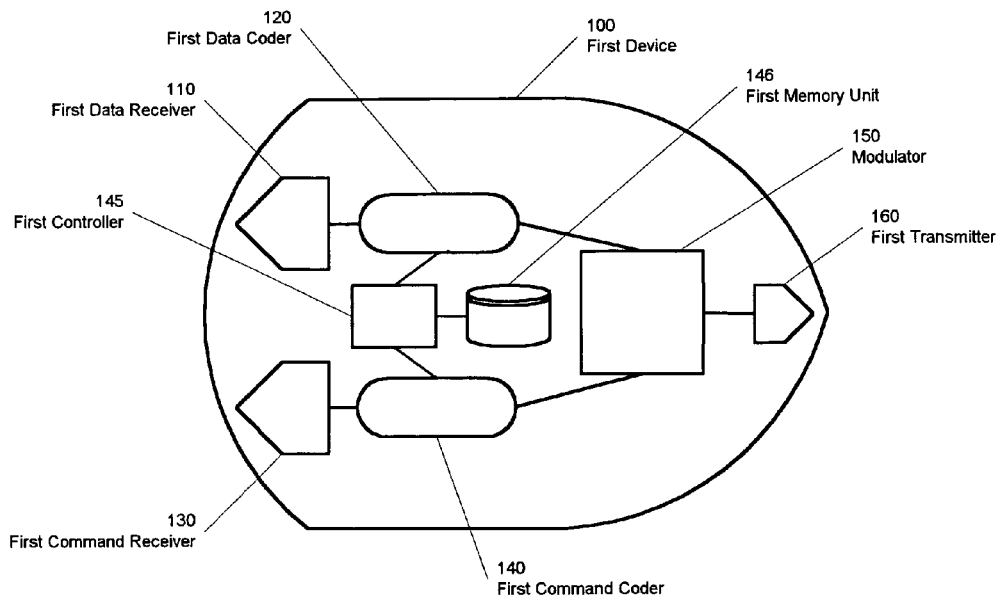
FIG. 2 shows an embodiment of a first device according to the present invention.

FIG. 2 shows an embodiment of first device 100 according to the present invention. In this embodiment, operations of first device 100 are controlled by a first controller 145. First controller 145 may be coupled to a first memory unit 146 which stores information about the data and command signals. First device 100 also includes a first data receiver 110 which receives the data signal from input device 5 (see FIG. 1). A first command receiver 130 of first device 100, on the other hand, receives the command signal from command device 15 (see FIG. 1).

In addition, first device 100 includes a first data coder 120 and a first command coder 140 which codes the data signal into a first signal and the command signal into a second signal, respectively. First device 100 also includes a modulator 150 which combines the first signal and the second signal into a transmission signal. The transmission signal is provided to a first transmitter 160 which transmits it to second device 200 over network 50.

Figure 3:
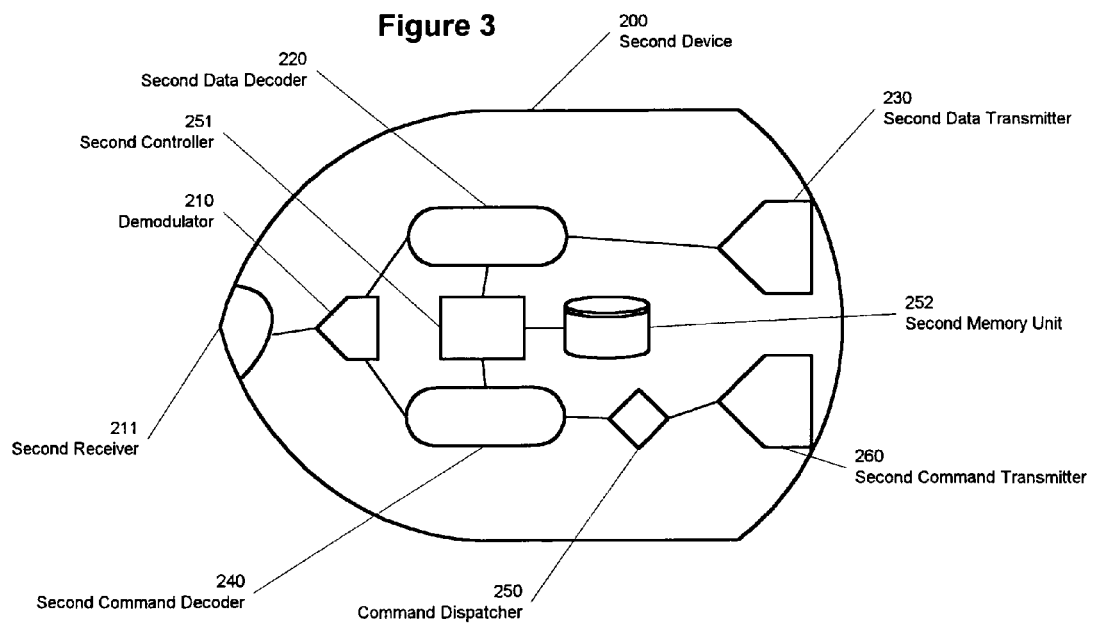
FIG. 3 shows an embodiment of a second device according to the present invention.

FIG. 3 shows an embodiment of second device 200 according to the present invention. In this embodiment, operations of second device 200 are controlled by a second controller 251. Second controller 251 is coupled to a second memory unit 252 which stores, e.g., information regarding the data and command signals. Second device 200 receives the transmission signal from first device 100 via a second receiver 211 and forwards it to a demodulator 210. Demodulator 210 separates the transmission signal into the first and second signals and transmits the first signal to a second data decoder 220 and the second signal to a second command decoder 240.

Second data decoder 220 decodes the first signal into the data signal. The second signal is decoded by second command decoder 240 into the command signal. The data signal is then transmitted to output device 25 (e.g., a television set) via a second data transmitter 230. The command signal is communicated to a second command transmitter 260 using a command dispatcher 250. Second command transmitter 260 transmits the command signal to target device 35 (e.g., a light control) using, e.g., a conventional transmission technology (e.g., a wireless technology, a FireWire technology, etc.).

In another embodiment of the present invention, second device 200 may include a User Preference Coordinator ("UPC") (not shown). The UPC, which may be stored in second memory unit 252, collects information about the user and the user's preferences (e.g., male/female, smoker/non-smoker, vegetarian/meat-eater, etc.) using a conventional software application. The UPC may filter the incoming data and command signals and select the data and command signals according to a predetermined preference. The predetermined preference may be based upon the user's preferences and may be modified by an authorized person (e.g., the user, a parent, an employer, etc.). The UPC may also adaptively learn the user's preferences by observing the user behavior over time. The UPC may be implemented as a software application or in hardware.

In another alternative embodiment, second device 200 may include a transmitting device, e.g., a modem (not shown). The transmitting device may serve as a back communication channel by allowing a transmission of, e.g., data provided by the UPC and/or the user (e.g., preferences, response to a survey, a buy order, a request for information, etc.) to first device 100, command device 15 and/or a predetermined device.

Figure 5:
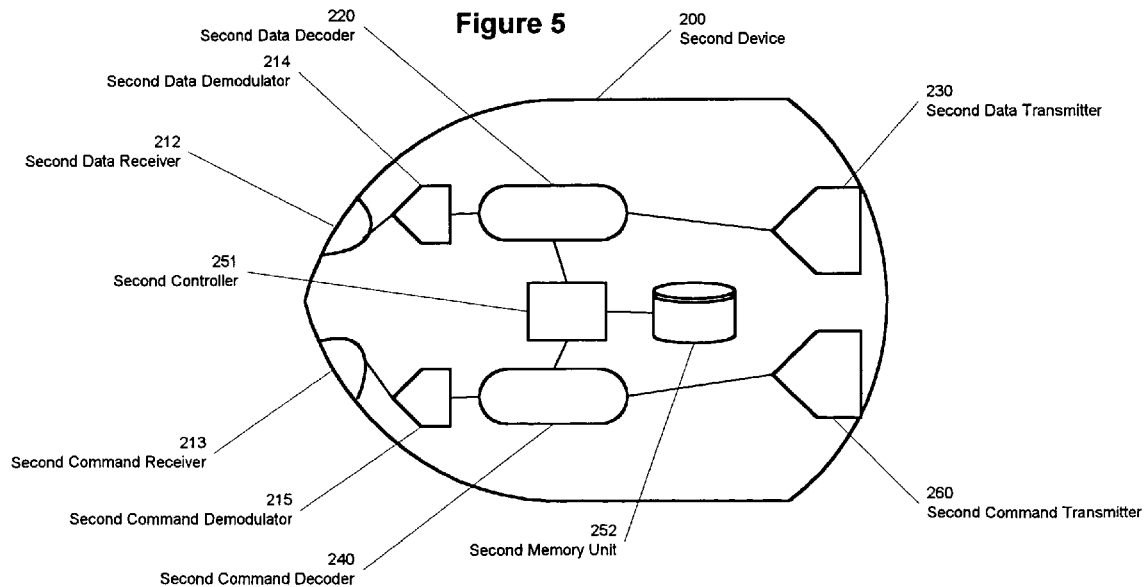
FIG. 5 shows another embodiment of the second device according to the present invention.
Figure 6:
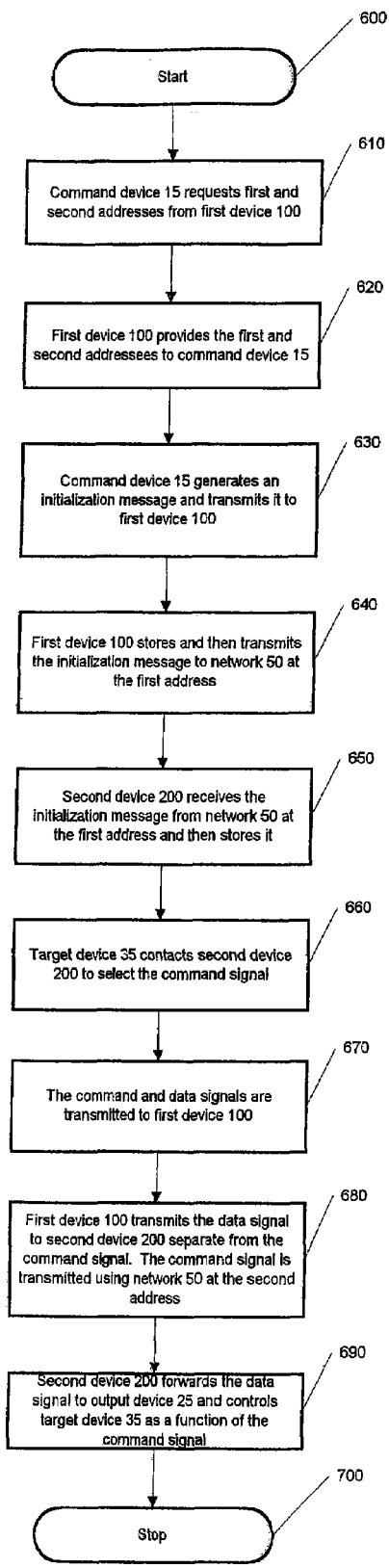
FIG. 6 shows a flow chart illustrating a method for controlling an electronic device according to the present invention.

An embodiment of a method utilizing system 1 for controlling the electronic device (e.g., second device 200, output device 25 and/or target 35) is illustrated in FIG. 6. System 1 includes alternative embodiments of first and second devices 100, 200 shown in FIGS. 4-5. The method for controlling the electronic device includes two phases: an initialization phase and a transmission phase.

The initialization phase begins with command device 15 contacting first device 100 to request network addresses, e.g., a first address and a second address (step 610). The first address is utilized to identify a location containing an initialization message, while the second address is utilized to identify a location containing the command signal. The initialization message may include, e.g., the second address, start and stop times of the TV program, description of the TV program, target device 35, etc.

Figure 4:
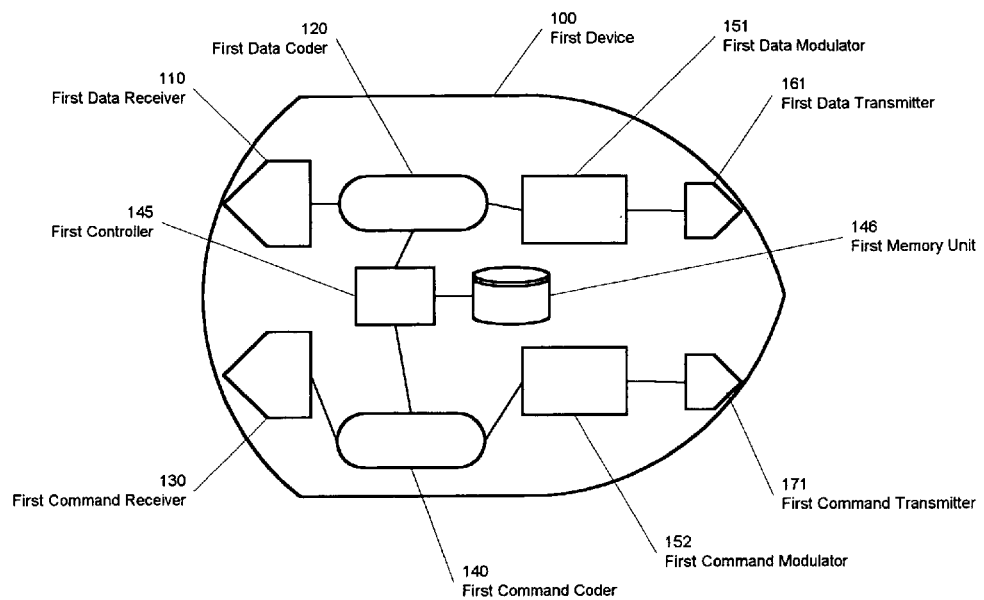
FIG. 4 shows another embodiment of the first device according to the present invention.

As shown in FIG. 4, first device 100 receives the request from command device 15 via first command receiver 130 which forwards the request to first controller 145. First controller 145 selects the first and second addresses from a pool of available network addresses stored in first memory unit 146. The first and second addresses are marked as "used" in first memory unit 146 and transmitted to command device 15 (step 620).

Command device 15 generates the initialization message and transmits it to first device 100 (step 630). First device 100 stores the initialization message into first memory unit 146 and transmits it to network 50 at the first address (step 640).

Second device 200 (shown in FIG. 5) is preconfigured to "listen" for initialization messages located at a plurality of predetermined network addresses which includes the first address. Second device 200 receives the initialization message located at the first address via second command receiver 213 (step 650). The initialization message is then forwarded to second controller 251 to be stored in second memory unit 252. Second controller 251 extracts information from the initialization message and stores it in a database. The database may be kept in second memory unit 252 and is managed by a device manager application ("DMA").

Target device 35 periodically contacts the DMA to select an incoming command signal (step 660) from the database. Once the command signal is selected (e.g., at a request of the user or according to the UPC described above), target device 35 and second device 200 are ready to receive the command signal from network 50 at the second address. This step completes the initialization phase.

The transmission phase begins with the data and command signals being transmitted to first device 100 from data and command devices 5, 15 (step 670). First device 100 does not combine the data and command signals into the transmission signal, instead these signals are transmitted to second device 200 separately. The signals are transmitted using first data and first command modulators 151, 152 which are coupled to first data and first command transmitters 161, 171. First device 100 transmits the command signal to network 50 at the second address (step 680).

Second device 200, which is preconfigured by the DMA, receives the command signal at the second address. The command signal is received by second command receiver 213, while the data signal is received by second data receiver 212. The data and command signals are decoded using second data and second command decoders 124, 125. The command and data signals are forwarded to corresponding output and target device 25, 35 (step 690).

The transmission signal may be generated using an analog format or a digital format. If the transmission signal is in the analog format, then first device 100 inserts the command signal in a particular portion of the data signal (e.g., using Vertical Blanking Interval ("VBI") techniques). The VBI is a portion of the data signal when, e.g., an electron gun of the television set has to reach a top of a picture tube of the television set from its bottom. The command signal may be transmitted using one of an in-band procedure and an out-of-band procedure. Once the transmission signal is received by second device 260, the command signal is extracted from the VBI portion.

If the transmission signal is in the digital format, the transmission signal consists of conventional data packets. Each data packet may include, e.g., a header portion, a body portion and a pointer portion. The header portion identifies the data packet, the body portion includes the data signal and the pointer portion points to a following data packet. The command signal may be transmitted separately or together with the data packet.

When the command signal is transmitted separate from the data packet, the command signal is transmitted using a command packet which has a structure similar to the structure of the data packet (e.g., a header portion, a body portion and a pointer portion). In addition, the command packet includes a second pointer portion which points to a corresponding data packet. The data packet and the command packet may transmitted and received by first and second devices 100, 200 shown in FIGS. 4 and 5.

The command signal can be also transmitted together with the data packet. In particular, the command signal may be included in an additional portion which is attached to the data packet. This transmission utilizes an alternative embodiment of first device 100 and second device 200 (shown in FIGS. 4a and 5a). This embodiment of first device 100, which is similar to one shown in FIG. 4, includes a third modulator 180 and a third transmitter 181. The third modulator 180 adds the additional portion to the data packet and the third transmitter 181 transmits the data packet over network 50 to second device 200.

The command portion is extracted using the alternative embodiment of second device 200 which is shown in FIG. 5a. This alternative embodiment, which is similar to the embodiment shown in FIG. 5, includes a fourth receiver 182 and a fourth demodulator 183. The fourth receiver 182 receives the data packet from network 50 and the fourth demodulator 183 extracts the data and command signals.

An advantage of the present invention is that it allows content providers to offer personalized services over an one-way network without a need for a reverse communication channel. For example, the broadcaster may send advertisement offers to the user during and/or after the TV program. The user may be reminded to buy or sample a particular product and/or service. The user may sample, buy and download, e.g., a particular product while watching the TV program.

The user may be offered to subscribe for personal scheduling services which would remind the user about predetermined events, e.g., a birthday, an anniversary; simultaneously, the user may be offered to buy gifts. The user, e.g., may subscribe to a particular service which would allow, e.g., to receive stock information while watching a business report. Alternatively, the user may "attend" interactive classes, receive handouts and submit exams.

A further advantage of the present invention is that it allows broadband content providers more flexibility in providing a compelling content. In addition, the present invention allows the broadcaster to turn on the television set and/or the audio system and transmit an emergency broadcast message. The broadcaster, e.g., may also control the VCR to record the TV program requested by the user.

Several embodiments of the present invention are specifically illustrated and/or described herein. However, it will be appreciated that modifications and variations of the present invention are covered by the above teachings and within the purview of the appended claims without departing from the spirit and intended scope of the present invention.

What is claimed is:

1. A method for controlling at least one target device, comprising:
    (a) obtaining a first address and a second address from a first device;
    (b) providing the first and second addresses to a command device;
    (c) providing a message, located at the first address to the first device using the command device, the message including the second address;
    (d) transmitting the message, located at the first address, to a second device;
    (e) extracting the second address from the message using the second device;
    (f) storing the second address using a memory unit;
    (g) providing a command signal and a data signal to the first device;
    (h) transmitting the command signal, located at the second address, to the second device;
    (i) controlling the at least one target device using the command signal;
    (j) transmitting the data signal to the second device;
    (k) providing the data signal to an output device by the second device; and
    (l) providing, by the output device, an output as a function of the data signal while the at least one target device is controlled using the command signal.

2. The method according to claim 1, wherein the message includes a predetermined data of the command and data signals.

3. The method according to claim 2, wherein the at least one target device selects the command signal as a function of the predetermined data.

4. A communication and control system, comprising:
    at least one target device;
    a first device;
    a command device configured to receive a first address and a second address obtained from the first device and provide a message to be provided at the first address to the first device, the message including the second address;
    a memory unit configured to store the second address;
    a second device configured to receive the message and extract the second address from the message, wherein:
        the first device is provided with a data signal and a command signal, the command signal to be provided at the second address;
        the data signal and the command signal are transmitted to the second device; and
        the second device controls the at least one target device using the command signal; and
    an output device configured to receive the data signal from the second device and provide an output as a function of the data signal while the at least one target device is controlled using the command signal.

5. The system according to claim 4, wherein the message includes a predetermined data of the command and data signals.

6. The method according to claim 5, wherein the at least one target device selects the command signal as a function of the predetermined data.

7. A computer-readable storage medium storing a set of instructions, the set of instructions capable of being executed by a processor to implement a control operation of at least one target device on at least one computer system, the method comprising:
    (a) obtaining a first address and a second address from a first device;
    (b) providing the first and second addresses to a command device;
    (c) providing a message, located at the first address to the first device using the command device, the message including the second address;

(d) transmitting the message, located at the first address, to a second device;
(e) extracting the second address from the message using the second device;
(f) storing the second address using a memory unit;
(g) providing a command signal and a data signal to the first device;
(h) transmitting the command signal, located at the second address, to the second device;
(i) controlling the at least one target device using the command signal;
(j) transmitting the data signal to the second device;
(k) providing the data signal to an output device by the second device; and
(l) providing, by the output device, an output as a function of the data signal while the at least one target device is controlled using the command signal.

8. The computer-readable storage medium according to claim 7, wherein the message includes a predetermined data of the command and data signals.

9. The computer-readable storage medium according to claim 8, wherein the at least one target device selects the command signal as a function of the predetermined data.

* * * * *